United States Patent
Jahn et al.

(10) Patent No.: US 12,005,997 B2
(45) Date of Patent: Jun. 11, 2024

(54) ANCHOR ROPE SYSTEM FOR AN OFFSHORE DEVICE

(71) Applicants: Christian Jahn, Quickborn (DE); Sebastian Obermeyer, Hamburg (DE)

(72) Inventors: Christian Jahn, Quickborn (DE); Sebastian Obermeyer, Hamburg (DE)

(73) Assignee: RWE Renewables GmbH, Essen (DE)

( * ) Notice: Subject to any disclaimer, the term of this patent is extended or adjusted under 35 U.S.C. 154(b) by 483 days.

(21) Appl. No.: 17/398,371

(22) Filed: Aug. 10, 2021

(65) Prior Publication Data

US 2021/0362808 A1 Nov. 25, 2021

Related U.S. Application Data

(63) Continuation of application No. PCT/EP2019/076936, filed on Oct. 4, 2019.

(30) Foreign Application Priority Data

Feb. 11, 2019 (DE) .................... 10 2019 103 305.5

(51) Int. Cl.
*B63B 21/50* (2006.01)
*B63B 21/00* (2006.01)
(Continued)

(52) U.S. Cl.
CPC .............. *B63B 21/50* (2013.01); *B63B 21/20* (2013.01); *D07B 1/145* (2013.01);
(Continued)

(58) Field of Classification Search
CPC .............. B63B 21/00; B63B 2021/008; B63B 2021/009; B63B 21/20; B63B 2021/203; B63B 21/50; B63B 2021/505; B63B 2035/446; D07B 1/145; D07B 1/16; D07B 2501/2061; G01L 1/24; G01L 1/242; G01L 5/04; G01L 5/10; G01L 5/105; G02B 6/443; Y02E 10/72; Y02E 10/727
See application file for complete search history.

(56) References Cited

U.S. PATENT DOCUMENTS 6,999,641 B2 * 2/2006 Williams ........... G01D 5/35354
385/5
10,633,790 B2 * 4/2020 Boye Hansen ........ D07B 1/148
(Continued)

FOREIGN PATENT DOCUMENTS

GB  2402944 A  12/2004
JP  S5929305 A  2/1984
(Continued)

OTHER PUBLICATIONS

"Money for New Rope—Bridon PLC", Steel Times, Fuel & Metallurgical Journals Ltd. London, GB, Bd. 225 Nr. 5, May 1, 1997, pp. 194-195, XP000692298, ISSN: 0039-095X.

*Primary Examiner* — Ajay Vasudeva
(74) *Attorney, Agent, or Firm* — Reinhart Boerner Van Deuren P.C.

(57) ABSTRACT

An anchor rope system for an offshore device for fixing an offshore device to a subsea floor. The anchor rope system includes at least one anchor rope surrounded by at least one sheathing. The anchor rope system includes at least one condition sensor formed by at least one fiber optic cable.

13 Claims, 5 Drawing Sheets

(51) Int. Cl.
- *B63B 21/20* (2006.01)
- *B63B 35/44* (2006.01)
- *D07B 1/14* (2006.01)

(52) U.S. Cl.
CPC ... *B63B 2021/008* (2013.01); *B63B 2021/009* (2013.01); *B63B 2021/203* (2013.01); *B63B 2035/446* (2013.01)

(56) References Cited

U.S. PATENT DOCUMENTS

| | | | |
|---|---|---|---|
| 2003/0154802 A1* | 8/2003 | Culshaw | D07B 1/145 |
| | | | 73/800 |
| 2005/0226584 A1 | 10/2005 | Williams et al. | |
| 2015/0088346 A1 | 3/2015 | Lee | |
| 2015/0246711 A1 | 9/2015 | Lee | |

FOREIGN PATENT DOCUMENTS

| | | | |
|---|---|---|---|
| JP | 2013084818 A | 5/2013 | |
| JP | 2016080658 A | 5/2016 | |
| WO | WO 01/98743 A1 | 12/2001 | |
| WO | WO 2016/063904 A1 | 4/2016 | |
| WO | WO 2016/114671 A1 | 7/2016 | |

* cited by examiner

ANCHOR ROPE SYSTEM FOR AN OFFSHORE DEVICE

CROSS-REFERENCE TO RELATED PATENT APPLICATIONS

This patent application is a continuation of International Application No. PCT/EP2019/076936, filed on Oct. 4, 2019, which claims the benefit of priority to German Patent Application No. 10 2019 103 305.5, filed Feb. 11, 2019, the entire teachings and disclosures of both applications are incorporated herein by reference thereto.

FIELD OF THE INVENTION

The application relates to an anchor rope system for an offshore device, in particular for attaching an offshore device to a subsea floor. Furthermore, the application relates to an anchor rope monitoring system, a method for operating an anchor rope monitoring system, a computer program and a use.

BACKGROUND OF THE INVENTION

Wind energy systems with at least one wind turbine are increasingly used to provide electrical energy from so-called renewable energy sources. In particular, a wind turbine is configured to convert the kinetic wind energy into electrical energy. In order to increase the energy yield in such systems, wind energy systems are located at sites with a high wind probability. In particular, offshore locations are usually characterized by relatively continuous wind conditions and high average wind speeds, so that so-called offshore wind energy systems and offshore wind farms, respectively, are increasingly being installed.

Usually, an offshore wind energy system and offshore wind farm, respectively, has a plurality of offshore devices, such as a plurality of offshore wind turbines and at least one offshore substation, via which the offshore wind energy system is electrically connected, for example, to an onshore substation or a further offshore substation and offshore converter station, respectively. An onshore substation, in turn, may be connected to a public power grid. In order to transmit electrical power between two offshore devices or an offshore device and an onshore device, offshore power cables are laid in the form of submarine cables.

While it has been common practice for offshore wind energy systems to be anchored to the subsea floor, in particular, a seabed, by a foundation structure (e.g., monopile, tripod, tripile, or jacket foundations), there are increasing considerations of installing floating offshore devices, such as floating offshore wind energy devices, to provide offshore wind energy systems, in particular, in areas with a large water depth, such as greater than 400 m.

In order to install the described floating (but stationary during operation) offshore wind energy devices, but also other offshore devices, it is known to fix them to the subsea floor with anchor systems, in particular, in order to anchor them. Currently, anchor chains formed from a number of interconnected steel rings are typically used for this purpose.

Since such anchor chains are relatively heavy and the manufacturing and installation costs increase significantly, in particular, with increasing water depth, it is assumed that so-called anchor rope systems (sometimes also referred to as anchor ropes for short) will be increasingly used as an alternative to the known anchor chain systems, especially at great depths. An anchor rope system usually comprises at least one or more anchor ropes (e.g., made of metal) and a sheathing surrounding the at least one anchor rope. Compared to anchor chain systems, anchor rope systems can be installed more easily, in particular, at water depths greater than 400 m, and can also be produced at lower cost.

However, a problem with offshore devices anchored by such anchor rope systems is that damage to an anchor rope system, in particular, a rupture of an anchor rope system, i.e. a so-called rope breakage, leads to considerable impairment of the operation of the offshore device. In particular, in the case of a floating offshore wind energy device, this can shut down the power production for a considerable time.

BRIEF SUMMARY OF THE INVENTION

Therefore, the object of the application is to provide an anchor rope system for offshore devices that at least reduces the risk of a rope breakage.

According to a first aspect of the application, the object is solved by an anchor rope system for an offshore device, in particular, for fixing an offshore device to a subsea floor according to claim 1. The anchor rope system comprises at least one anchor rope surrounded by at least one sheathing. The anchor rope system comprises at least one condition sensor formed by at least one fiber optic cable.

In contrast to the prior art, according to the application an anchor rope system is provided in which the risk of rope breakage is at least reduced by providing a condition sensor in the anchor rope system, in particular, by integrating it in the anchor rope system. Even minor damages of an anchor rope system can be detected at an early stage with little effort, so that measures to eliminate the impairment can be initiated at an early stage. A production shut down of an offshore wind energy device due to a rope breakage can be prevented, or at least minimized.

In particular, the anchor rope system according to the application serves to fix an offshore device, in particular a floating (but preferably stationary in operation) offshore device. A further application of an anchor rope system according to the application is the connection of at least one further structural element (located below the water surface) to the offshore device, in particular, the floating body of the offshore device. In particular, a floating offshore device may have at least one floating body. Preferably, the floating offshore device is a floating offshore wind energy device, in particular, an offshore wind turbine or an offshore substation.

Such an offshore device can be fixed, in particular, anchored, to a subsea floor (e.g., seabed) via at least one anchor rope system according to the application, in particular, via a plurality of anchor rope systems. This allows, in particular, to install floating offshore wind energy devices in areas with a large water depth, for example, of more than 400 m. It shall be understood that the anchor rope system can also be used in shallower water depths.

An anchor rope system according to the application is understood to be an elongated (in particular, tubular) element, which is at least partially formed by at least one natural fiber and/or synthetic fiber and/or at least one wire and wire rope, respectively. In particular, an anchor rope system does not have chain elements.

Presently, the (rope-shaped) anchor rope system comprises at least one anchor rope which is formed of metal, in particular, steel, and/or plastic, in particular, at least one fiber composite material. Preferably, two or more anchor ropes may be provided. In particular, two or more anchor ropes may be twisted together. By means of the at least one anchor rope, in particular, the mechanical fixation of the offshore device to the subsea floor can be ensured.

In order to protect the at least one anchor rope, the anchor rope system comprises an (outer) sheathing. The sheathing surrounds and encloses, respectively, the at least one anchor rope in a radial direction. Preferably, the sheathing can be formed by plastic, in particular, at least one fiber composite material.

In order to detect even minor damages (e.g. microcracks) at an early stage and thus prevent the risk of a rope breakage, it is proposed according to the application to equip an anchor rope system with a condition sensor in the form of a fiber optic cable. The fiber optic cable is designed, in particular, as a linear condition sensor. The fiber optic cable may have at least one optical fiber. In particular, the fiber optic cable is configured to detect anchor rope system parameters that are at least indicative of the mechanical condition and structural condition, respectively, of the anchor rope system. For example, vibrations (or acoustic emissions) of the anchor rope system can be detected by the condition sensor. These can then be evaluated to draw conclusions about the mechanical condition and structural condition of, respectively, the anchor rope system.

In particular, the fiber optic cable is integrated in the anchor rope system, i.e. surrounded and enclosed, respectively, by the (outer) sheathing (in radial direction) and may preferably extend (as seen in longitudinal direction of the anchor rope system) along substantially the entire anchor rope system. In other words, according to one embodiment of the anchor rope system according to the application, the at least one fiber optic cable may preferably extend substantially from a first end of the anchor rope system, which may be fixed to the offshore device, in particular, the floating body of the offshore device, to the other end of the anchor rope system, wherein the other end may be connected to or comprise an anchoring element (e.g. a foundation). By this means, substantially the entire anchor rope system can be monitored.

The at least one fiber optic cable can serve as a condition sensor of an (optical) anchor rope monitoring system, and preferably be operated based on optical time domain reflectometry, also known as optical time domain reflectometry (OTDR). In particular, such an optical fiber optic cable allows a location-dependent monitoring, so that in addition to any damage, such as a micro-crack, the location of the micro-crack on the anchor rope system can also be determined.

According to a further embodiment of the anchor rope system according to the application, the fiber optic cable may be arranged in the anchor rope system (directly) adjacent to the (at least one) anchor rope. For example, the fiber optic cable may be in contact with at least one anchor rope, i.e. contact it at least in sections. This can improve monitoring of the at least one (mechanically) supporting anchor rope.

An anchor rope system may, in a conventional manner, have a substantially circular cross-sectional area. According to a particularly preferred embodiment, the at least one fiber optic cable may extend in the center of the substantially circular cross-sectional area of the anchor rope system. A plurality of anchor ropes may then preferably be arranged, in particular, wound, for example twisted, around the fiber optic cable forming the longitudinal axis. By arranging the fiber optic cable in the center of the substantially circular cross-sectional area of the anchor rope system, in particular, a (substantially) symmetrical structure of the anchor rope system can be provided. In addition, the monitoring of the preferably plurality of anchor ropes wound around the fiber optic cable can be further improved.

As has already been described, the at least one fiber optic cable may comprise at least one optical fiber, preferably at least two optical fibers. According to a preferred embodiment of the anchor rope system according to the application, the at least one optical fiber may be arranged in a tubular element of the fiber optic cable. In other words, the at least one optical fiber may be surrounded (in radial direction) by at least one protective layer, in particular, a protective tube. The at least one optical fiber may be a single-mode fiber or a multi-mode fiber.

In a preferred embodiment of the anchor rope system according to the application, the tubular element may be formed from a plastic material and/or a glass fiber material and/or a carbon fiber material and/or the material from which the at least one anchor rope is formed. A reduction of the forces exerted by the at least one anchor rope on the at least one fiber optic cable can be achieved.

Also, in particular, a tube made of glass can be used as a tube element for the at least one optical fiber.

Particularly preferably, the tubular element may be made of the plastic material high density polyethylene (HDPE). It has been shown that a corresponding plastic material meets the requirements of an anchor rope system particularly well.

Preferably, the fiber optic cable may comprise a armoring layer surrounding the tubular element. Preferably, the armoring layer can be formed from a plurality of armoring ropes. Preferably, these armoring ropes may be formed of a fiber composite material. Alternatively or additionally, at least a portion of the armoring ropes may be formed of metal, in particular, steel. The protection of the at least one optical fiber of the fiber optic cable can be further improved.

According to a particularly preferred embodiment of the anchor rope system according to the application, a viscoelastic fluid may be arranged in the tubular element of the fiber optic cable. In other words, the at least one optical fiber may extend in a tubular element filled with a viscoelastic fluid. Protection of the at least one optical fiber may be further enhanced. Preferably, the viscoelastic fluid may be a gel material or a gel-like mass. A silicone gel is particularly suitable.

Furthermore, according to a further embodiment of the anchor rope system according to the application, it can be provided that at least one barrier protection layer, in particular, a sand protection layer, is arranged between the at least one anchor rope, in particular, the plurality of anchor ropes, and the (outer) sheathing. The anchor ropes are thus even better protected.

It shall be understood that in other embodiments, an anchor rope system may comprise further elements, such as filler materials, a plastic layer adjoining the armoring layer, which may be provided in particular to hold together the components located under the plastic layer, etc.

As has already been described, at least one anchor rope may be formed of a fiber composite material. Preferably, the plurality of anchor ropes may be formed at least partially of metal, in particular, steel, and at least partially of a fiber composite material. The same preferably applies to a plurality of armoring ropes. Different fiber composite materials can be used here. Preferably, carbon fiber can be used as the fiber composite material in order to provide a particularly resistant anchor rope system. It shall be understood that in other variants, other fiber composite materials may also be used additionally or alternatively, for example, glass fiber and/or aramid fiber or the like.

A further aspect of the present application is an anchor rope monitoring system for monitoring the condition of a previously described anchor rope system. The anchor rope monitoring system comprises at least one monitoring device connectable to the at least one fiber optic cable of the anchor rope system to be monitored. The monitoring device comprises an evaluation unit. The evaluation unit is configured to evaluate at least one sensor signal that can be received by the fiber optic cable.

In particular, it has been recognized that by evaluating the sensor signal receivable from the fiber optic cable, it is possible to conclude the (instantaneous) mechanical and/or structural condition of the monitored anchor rope. For example, based on the evaluation of the sensor signal, it can be detected whether the anchor rope system is mechanically and structurally, respectively, impaired, for example, an anchor rope has one or more (micro) crack(s). This makes it possible to detect a damage of the anchor rope system at an early stage and, in particular, to initiate measures to remedy the damage of the anchor rope system before a damage of the anchor rope system, in particular a cable break, occurs which impairs the operation of the offshore device.

The monitoring device may preferably be installed on or in the offshore device. The evaluation may, in particular, comprise an evaluation of the amplitude, frequency, phase and the like.

According to a first embodiment of the anchor rope monitoring system according to the application, the evaluation unit may be configured for comparing the sensor signal with at least one reference criterion. For example, the reference criterion may be a limit value and/or a permissible parameter range. If, for example, the permissible parameter range definable by at least one limit value is exceeded by the parameter values obtained from the sensor signal, the evaluation leads, in particular, to an evaluation result that the condition of the anchor rope system is impaired. This can be the case, for example, if detected anchor rope system vibrations and/or sound emissions lie outside the permissible vibration or sound range. In this case, a corresponding message/information about the detected deviation can be output.

Preferably, the strength and degree, respectively, of impairment and damage, respectively, can be determined, for example, based on the determined discrepancy between the at least one measured parameter value and a limit value. As further described above, the damage position on the anchor rope system can also be determined.

If, on the other hand, the at least one parameter value obtained from the sensor signal is within the permissible parameter range, for example, if the at least one limit value is not exceeded, the evaluation leads, in particular, to the evaluation result that the condition of the anchor rope system is not impaired. This can be the case, for example, if detected anchor rope system vibrations are within the permissible vibration range.

The reference criterion may, for example, be fixedly provided and may, for example, have been calculated in advance by simulations and/or determined by tests. Preferably, the at least one reference criterion, i.e. in particular, the at least one (location-dependent) limit value and/or the at least one (location-dependent) permissible parameter range, can be determined individually for each anchor rope system. According to a particularly preferred embodiment, the at least one reference criterion can be based on at least one historical sensor signal of the anchor rope system to be monitored. In particular, it has been recognized that due to manufacturing tolerances, dimensions of an anchor rope system (in particular, different lengths) and/or environmental conditions encountered at the installation site of the anchor rope system, the actual allowable (location-dependent) parameter range (e.g., allowable strength of vibrations) of a first anchor rope system may differ from the actual allowable (location-dependent) parameter range of a further anchor rope system.

In order to enable an optimized and for each anchor rope system a monitoring depending on the individual properties of the respective anchor rope system and/or the individual environmental properties of the respective installation site, it is, in particular, proposed to first record a plurality of sensor signals for each anchor rope system after installation. Assuming that an anchor rope system is in a good and proper, respectively, structural condition, i.e. damage-free condition, (immediately) after the installation, a plurality of sensor signals (recorded at different times and for a specific period of time (e.g. X weeks, X months, etc.)) can preferably be recorded. These sensor signals can be regarded as admissible sensor signals, so that based on these sensor signals the at least one reference criterion can be determined (e.g. by averaging, extreme value formation, etc.). For example, this can be used to determine the maximum permissible vibration strength and/or sound level for each anchor rope system. Subsequently, in a simple and at the same time reliable manner, the anchor rope system can be monitored by a comparison operation.

The at least one recorded sensor signal and/or the at least one reference criterion can be stored in a data memory of the anchor rope monitoring system.

According to a further embodiment, the monitoring device may comprise at least one measurement signal generator. The measurement signal generator may be configured to inject (couple) an optical measurement signal into the fiber optic cable of the anchor rope system to be monitored. The evaluation unit can be configured to receive and, in particular, evaluate the sensor signal generated in response to the optical measurement signal in the fiber optic cable. In particular, the evaluation may be based on the measurement signal and the sensor signal that caused the measurement signal.

As has already been described, the monitoring device may be operated, in particular, according to the OTDR method. For example, the measurement signal generator can inject at least one light pulse, in particular, laser pulse, (with a duration between, for example, 3 ns to 20 µs) into the fiber optic cable as the measurement signal. The backscattered light can be measured over time as the sensor signal, in particular, by the evaluation unit. The time dependence of the sensor signal can, in particular, be converted into a location dependence, so that a spatially resolved determination of the mechanical structural condition of the anchor rope system (for example, on the basis of the vibration data, sound data, etc. obtained from the sensor signal) can be made.

According to a further embodiment, (instantaneous) environmental data (e.g., water temperature, flow direction, flow strength, wave height, etc.) can preferably be taken into account during the evaluation. The environmental data can have an influence on the sensor signal without changing the actual condition of the anchor rope system. By taking into account (instantaneous) environmental data (e.g., water temperature, current direction, current strength, wave height, etc.) during the evaluation, the reliability of the monitoring can be improved.

A further aspect of the application is a method for operating an anchor rope monitoring system, in particular, an anchor rope monitoring system described above. The monitoring method comprises:

causing an injecting of an optical measurement signal into at least one fiber optic cable of an anchor rope system to be monitored, evaluating at least one received sensor signal from the fiber optic cable in response to the injected optical measurement signal, wherein the evaluating comprises determining the condition of the anchor rope system to be monitored based on the received sensor signal and on at least one reference criterion.

A still further aspect of the application is a computer program having instructions executable on a processor such that an anchor rope monitoring system is operated in accordance with the method previously described. In particular, the instructions may be stored on a storage medium that is readable by the processor to perform the method described above.

A still further aspect of the application is a use of a previously described anchor rope system for fixing, in particular, anchoring, an offshore device, in particular, an offshore wind energy device, to a subsea floor.

The features of the anchor rope systems, anchor rope monitoring systems, methods, computer programs and uses can be freely combined with each other. In particular, features of the description and/or dependent claims may be independently inventive, even by completely or partially bypassing features of the independent claims, alone or freely combined with each other.

BRIEF DESCRIPTION OF THE DRAWINGS

There is now a plurality of possibilities for designing and further developing the anchor rope system according to the application, the anchor rope monitoring system according to the application, the method according to the application, the computer program according to the application and the use of an anchor rope system according to the application. For this purpose, reference is made, on the one hand, to the patent claims subordinate to the independent patent claims and, on the other hand, to the description of embodiments in connection with the drawing. In the drawing shows:

In the figures, the similar reference signs are used for the similar elements.

DETAILED DESCRIPTION OF THE INVENTION

Figure 1:
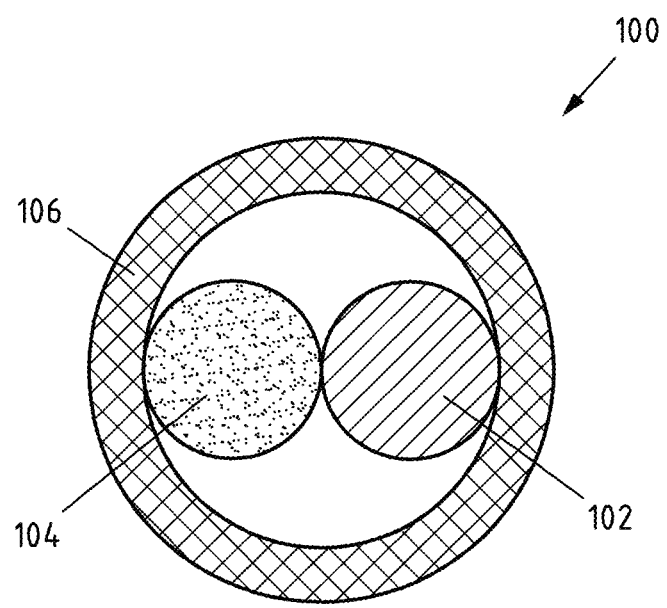
FIG. 1 a schematic cross-sectional view of an embodiment of an anchor rope system according to the present application, FIG. 2 a schematic cross-sectional view of a further embodiment of an anchor rope system according to the present application, FIG. 3 a schematic view of an embodiment of an anchor rope monitoring system according to the present application, FIG. 4 a schematic view of an offshore device with an embodiment of an anchor rope monitoring system according to the present application, and FIG. 5 a diagram of an embodiment of a method according to the present application.

FIG. 1 shows a schematic view, in particular, a cross-sectional view, of an embodiment of an anchor rope system 100 according to the present application.

In the present case, the anchor rope system 100 comprises an anchor rope 102 (e.g., made of steel), a fiber optic cable 104 comprising at least one optical fiber, and an outer sheathing 106 (e.g., made of a plastic material) surrounding the anchor rope 102 and the fiber optic cable 104.

The sheathing 106 serves to protect the components 102, 104 surrounded by the sheathing 106. The anchor rope 102 serves substantially to absorb forces that occur after installation of the anchor rope system 102.

In particular, a first end of the anchor rope 102 is connected to the offshore device, which is preferably floating (but substantially stationary in operation), and the further end is connected (fixed) to an anchoring means attached to the subsea floor. This allows the floating offshore device to be fixedly anchored to the subsea floor.

The fiber optic cable 104 extends substantially from the first end of the anchor rope 102 to the further end of the anchor rope 102, and the fiber optic cable 104 is configured as a linear condition sensor 104. In particular, by the use of the fiber optic cable 104 the mechanical condition and structural condition, respectively, of the anchor rope system 100, in particular, the at least one anchor rope 102, can be monitored.

As can be further seen in FIG. 1, preferably the fiber optic cable 104 is arranged immediately adjacent to at least one anchor rope 102 so that the latter can be monitored particularly reliably.

Figure 2:
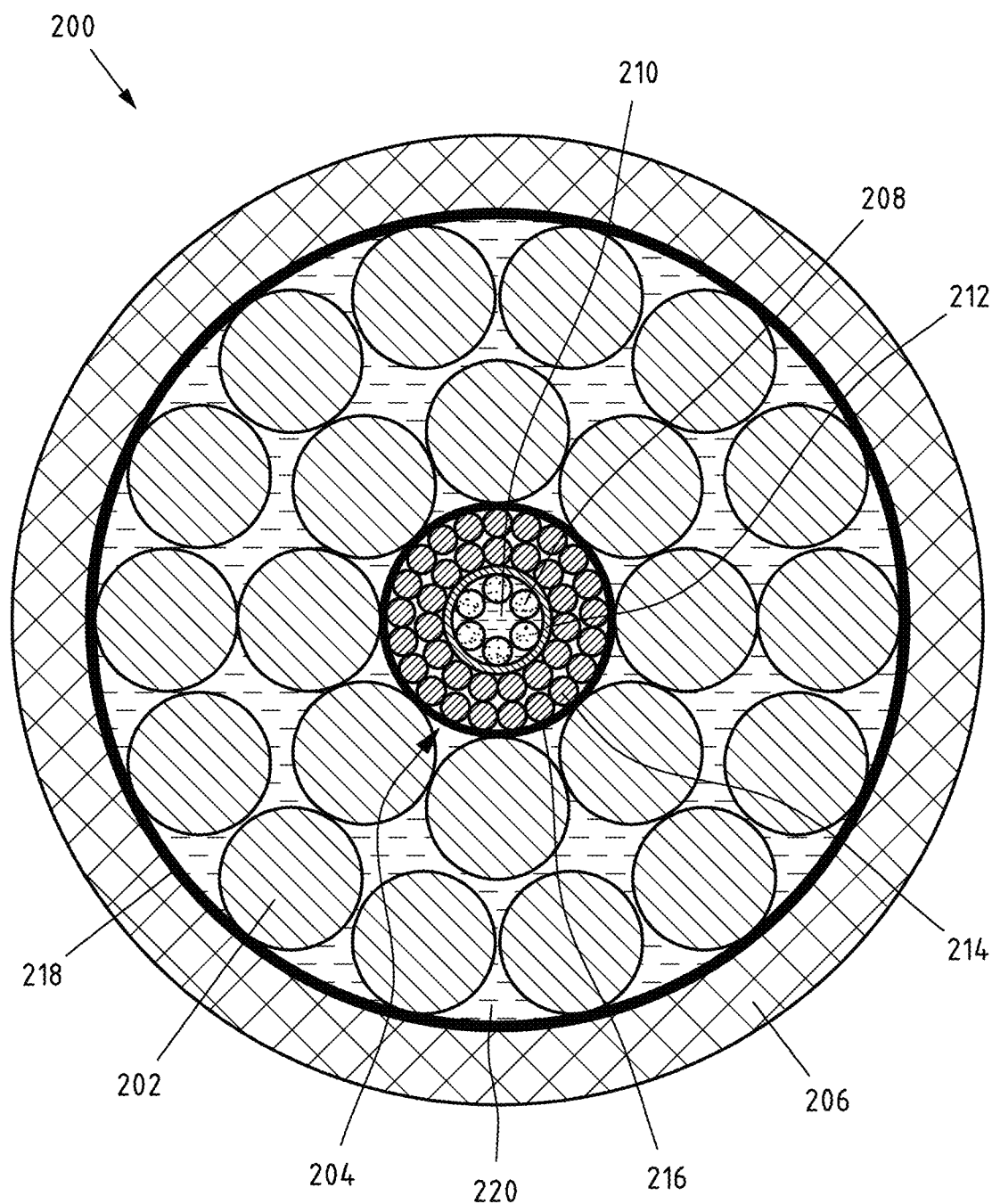

FIG. 2 shows a schematic cross-sectional view of a further embodiment of an anchor rope system 200 according to the present application.

The shown anchor rope system 200 comprises an fiber optic cable 204, a plurality of anchor ropes 202, and an outer sheathing 206 (e.g., made of a plastic material).

Furthermore, a barrier protection layer 218, in particular, a sand protection layer 218, is optionally arranged between the anchor ropes 204 and the sheathing 206. This serves, in particular, to protect the anchor ropes 202.

Furthermore, the anchor rope system 200 may optionally comprise filler material 220 (also referred to as fillers). In particular, cavities in the anchor rope system 200 may be filled with a filler material 220 to provide a substantially circular cross-sectional shape of the elongated anchor rope system 200.

As can be seen, the fiber optic cable 204 is arranged in the center of the anchor rope system 200. In particular, the fiber optic cable 204 forms the center axis of the anchor rope system 200. In the present embodiment, a plurality of anchor ropes 202 are directly arranged, in particular, wound, around the fiber optic cable 204.

The anchor ropes 204 may preferably be formed at least partially of metal (e.g., steel) and at least partially of a fiber composite material (e.g., carbon fiber). In this way, the positive properties of the materials used (high mechanical strength (steel), low weight (carbon fiber), etc.) can be combined. It shall be understood that in other variants of the application, all of the anchor ropes may be formed from the same material.

In the present preferred embodiment, the fiber optic cable 204 is formed as follows:

In the present embodiment, the fiber optic cable 204 comprises a plurality of optical fibers 208. The optical fibers 208 are surrounded by a tubular element 212. The tubular element 212 may be formed of metal and/or at least one plastic material. In particular, the tubular element 212 serves to protect the optical fibers 208 disposed within the tubular element 212.

In order to further improve the protection, an armoring layer 214, presently formed of two sub-armoring layers, each formed of a plurality of armoring ropes, is provided. In particular, the armoring layer 214 directly surrounds the tubular element 212. Preferably, a first sub-armoring layer may be formed (only) of armoring ropes made of metal (e.g., steel) and the further sub-armoring layer may be formed (only) of armoring ropes made of a fiber composite material (e.g., carbon fiber). As described above, this allows the positive properties of the two materials used to be combined in the RMORING layer.

It shall be understood that in other variants of the application, only one sub-layer, more than two sub-layers and/or armoring ropes made of a (different) material, for example, all armoring ropes made of the same material, may also be provided.

Furthermore, the tubular element 212 is filled with a viscoelastic fluid 210, for example, a silicone gel. Furthermore, the fiber optic cable 204 has, in the present embodiment, a plastic layer 216 as an outer layer, in particular, made of extruded plastic. This has the task of holding together the other components 208 to 214 of the fiber optic cable 204.

Figure 3:
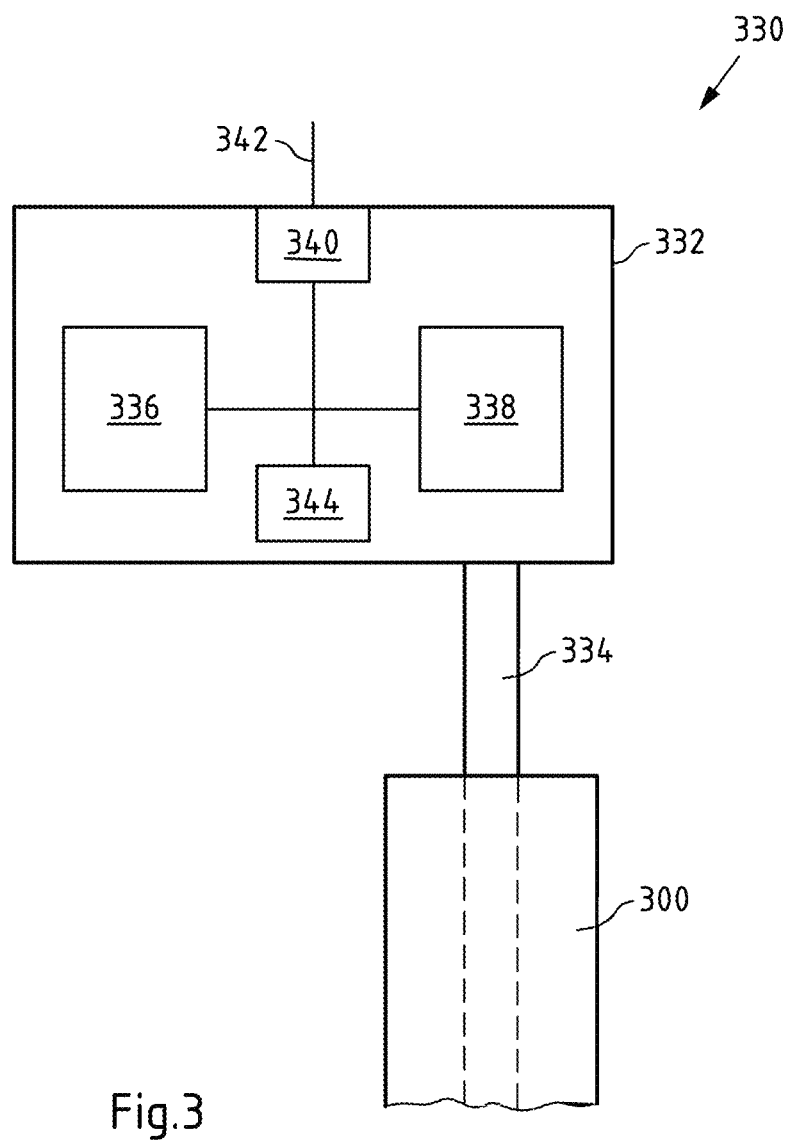

FIG. 3 shows a schematic view of an embodiment of an anchor rope monitoring system 330 according to the present application. The anchor rope monitoring system comprises a monitoring device 332, which may preferably be installed at or on the floating offshore device.

The monitoring device 332 may be formed at least in part by hardware means and/or at least in part by software means. In particular, the monitoring device is communicatively connected to the fiber optic cable of the anchor rope system 300 via an interconnecting fiber optic cable 334.

The anchor rope system 300 may preferably be an anchor rope system according to the embodiment shown in FIG. 2. The connecting fiber optic cable 334 may be formed by at least one extended optical fiber of the fiber optic cable of the anchor rope system 300.

Figure 5:
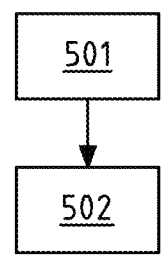

In the present embodiment, the monitoring device 332 comprises an evaluation unit 338, a measurement signal generator 344, a data memory 336 and a communication module 340. The operation of the monitoring device 332 is described in more detail below with the aid of FIG. 5.

In a first step 501, a measurement signal, preferably in the form of at least one light pulse, in particular, a laser pulse, is generated by the measurement signal generator 344 and fed (injected) into the fiber optic cable, in particular, the at least one optical fiber of the fiber optic cable, of the anchor rope system 300. In response to the measurement signal, a sensor signal, preferably in the form of time-dependent scattered light, can be received from the fiber optic cable of the anchor rope system 300, in particular, by the evaluation unit 338.

The received sensor signal can be evaluated in step 502, in particular, based on at least one reference criterion, which can be stored in the data memory 336.

For example, during the evaluation, the time-dependent sensor signal may first be converted into a location-dependent sensor signal and then compared to a location-dependent reference criterion, wherein the location-dependent reference criterion may, in particular, define an allowable location-dependent parameter range.

If, for example, the permissible parameter range definable by at least one limit value is exceeded by the parameter values obtained from the sensor signal, the evaluation results in an assessment that the structural condition of the anchor rope system 300 is impaired. Then, a corresponding notification/message can be output by the communication module 340 via a communication channel 342. Preferably, the degree of the impairment can be determined in this case, for example, based on the determined discrepancy of the at least one measured parameter value from a threshold value.

If, on the other hand, the at least one parameter value obtained from the sensor signal is within the permissible parameter range, for example, if the at least one limit value is not exceeded, the evaluation results, in particular, in the condition of the anchor rope system being assessed as not impaired.

Particularly preferably, the at least one reference criterion can be based on at least one, preferably a plurality of previously recorded historical sensor signals of the anchor rope system 300 to be monitored. Optionally, environmental data of the monitored anchor rope system 300 (e.g., water temperature, current direction, current strength, wave height, etc.) may be taken into account during the evaluation in step 502.

Figure 4:
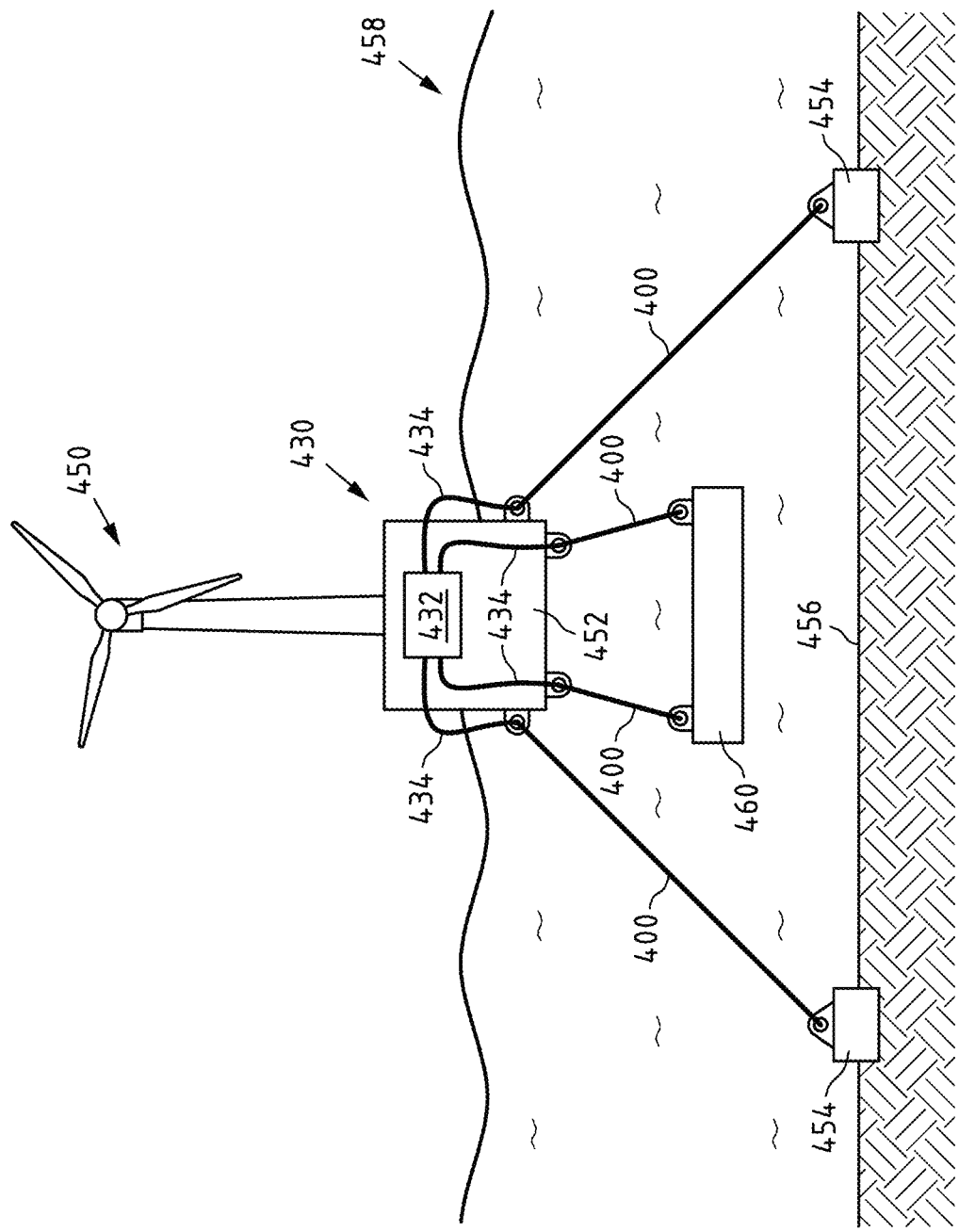

FIG. 4 shows a schematic view of an offshore device 450 arranged on the water 458, which is fixed, in particular, anchored, to the subsea floor 456 by two anchor rope systems 400.

In particular, the offshore device 450 is a floating offshore wind turbine 450 having a floating body 452 to which one end of each of the anchor rope systems 400 is mechanically attached. An anchor rope system 400 may, in particular, be formed according to the embodiment according to FIG. 2.

The respective other end of the anchor rope systems 400 is in each case fixed, in particular, anchored, to the subsea floor 456 via an anchor 454. It shall be understood that more than two anchor rope systems 400 may also be used.

Furthermore, an anchor rope monitoring system 430 is provided with a monitoring device 432 to which the respective fiber optic cables of the anchor rope systems 400 are coupled via connecting fiber optic cables 434. The monitoring device 432 may be formed similar to the monitoring device shown in FIG. 3. The operation of the anchor rope monitoring system 430 may be similar to the operation of the anchor rope monitoring system of FIG. 3, so that reference is made to the previous explanations.

Optionally, the offshore device 450 may have at least one structural element 460. As can be seen, the at least one structural element 460 is connected to the floating body 452 of the offshore device 450 via at least one anchor rope system 400 (exemplarily two anchor rope systems in the present case). The structural element 460 may form a triangle in a horizontal plane, the (three) legs of which may be tubular in shape and connected to the floating body 452 via a plurality of anchor rope systems 400. An anchor rope system 400 may be monitored in a manner previously described. In particular, such a structural element 460 may be a ballast body and may preferably serve to improve the stability of the offshore device 450. In particular, the upright floating position of the offshore device 450 may be maintained (with a higher degree of safety) during operation.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Anchor rope system for fixing an offshore device to a subsea floor, comprising:
    at least one anchor rope surrounded by at least one sheathing, and
    at least one condition sensor formed by at least one fiber optic cable,
    wherein the at least one fiber optic cable comprises at least one optical fiber,
    wherein the at least one optical fiber is arranged in a tubular element of the fiber optic cable,
    wherein the fiber optic cable comprises an armoring layer surrounding the tubular element,
    wherein the armoring layer comprises a plurality of armoring ropes formed from fiber composite material and/or metal.

2. Anchor rope system according to claim 1, wherein the fiber optic cable is arranged in the anchor rope system adjacent to the anchor rope.

3. Anchor rope system according to claim 1, wherein the anchor rope system has a substantially circular cross-sectional area, and
    the at least one fiber optic cable extends in the center of the substantially circular cross-sectional area of the anchor rope system.

4. Anchor rope system according to claim 1, wherein the at least one fiber optic cable comprises at least two optical fibers.

5. Anchor rope system according to claim 4, wherein a viscoelastic fluid is arranged in the tubular element of fiber optic cable.

6. Anchor rope monitoring system for monitoring the condition of an anchor rope system that fixes an offshore device to a subsea floor, comprising at least one anchor rope surrounded by at least one sheathing, and at least one condition sensor formed by at least one fiber optic cable, the anchor rope monitoring system comprising:
    at least one monitoring device connectable to the at least one fiber optic cable of the anchor rope system to be monitored,
    wherein the monitoring device comprises an evaluation unit configured to evaluate at least one sensor signal receivable by the fiber optic cable,
    wherein the evaluation unit is configured to compare the received sensor signal with at least one reference criterion,
    wherein the reference criterion is based on at least one historical sensor signal of the anchor rope system to be monitored,
    wherein a plurality of sensor signals are recorded for each anchor cable system after installation and the at least one reference criterion is determined based on these sensor signals,
    wherein the reference criterion is stored in a data memory of the anchor cable monitoring system.

7. Anchor cable monitoring system according to claim 6, wherein
    the maximum permissible vibration strength and/or sound level is determined for each anchor cable system.

8. Anchor rope monitoring system according to claim 6, wherein
    the at least one reference criterion is determined by averaging and/or extreme value formation from the sensor signals.

9. Method of operating the anchor rope monitoring system according to claim 6, comprising:
    causing an injecting of an optical measurement signal into the at least one fiber optic cable of the anchor rope system to be monitored,
    evaluating at least one received sensor signal from the fiber optic cable in response to the injected optical measurement signal,
    wherein the evaluating comprises determining the condition of the anchor rope system to be monitored based on the received sensor signal and on at least one reference criterion by comparing the received sensor signal with the reference criterion,
    wherein the reference criterion is based on at least one historical sensor signal of the anchor rope system to be monitored,
    wherein a plurality of sensor signals are recorded for each anchor cable system after installation and the at least one reference criterion is determined based on these sensor signals,
    wherein the reference criterion is stored in a data memory of the anchor cable monitoring system.

10. Method according to claim 9, wherein
    the maximum permissible vibration strength and/or sound level is determined for each anchor cable system.

11. Method according to claim 9, wherein
    the at least one reference criterion is determined by averaging and/or extreme value formation from the sensor signals.

12. Computer program with instructions executable on a processor such that an anchor rope monitoring system is operated according to the method of claim 9.

13. Use of the anchor rope system according to claim 1 for fixing the offshore device that is an offshore wind energy device, to the subsea floor.

* * * * *